(12) United States Patent
Lee (10) Patent No.: US 7,656,539 B1
(45) Date of Patent: Feb. 2, 2010

(54) MULTI-CONJUGATE ADAPTIVE OPTICS SYSTEM FOR FIELD CONJUGATION

(75) Inventor: Lawton H. Lee, Castro Valley, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 167 days.

(21) Appl. No.: 11/929,852

(22) Filed: Oct. 30, 2007

Related U.S. Application Data (60) Provisional application No. 60/855,122, filed on Oct. 30, 2006.

(51) Int. Cl.
*G01B 9/02* (2006.01)
*G01J 1/20* (2006.01)
(52) U.S. Cl. .................. 356/521; 356/450; 250/201.9
(58) Field of Classification Search ............. 356/450, 356/488, 494, 499, 512, 521; 250/201.9
See application file for complete search history.

(56) References Cited

U.S. PATENT DOCUMENTS

| | | | | |
|---|---|---|---|---|
| 5,051,571 | A * | 9/1991 | Brown et al. | 250/201.9 |
| 7,038,791 | B2 * | 5/2006 | Smith | 356/520 |
| 7,197,248 | B1 * | 3/2007 | Vorontsov et al. | 398/119 |
| 7,333,215 | B2 * | 2/2008 | Smith | 356/520 |

OTHER PUBLICATIONS

Farinato, Jacopo et al. "The MCAO wavefront sensing system of LINC-NIRVANA: status report". Advances in Adaptive Optics II, Proceedings of the SPIE, vol. 6272, Jul. 1, 2006. pp. 627229-1-627229-9.*
Barchers, Jeffrey D. "Evaluation of the impact of finite-resolution effects on scintillation compensation using two deformable mirrors". Journal of the Optical Society of America A, vol. 18, No. 12, Dec. 2001. pp. 3098-3109.*
M. Tallon and R. Foy, "Adaptive telescope with laser probe: isoplanatism and cone effect," *Astronomy and Astrophysics* 235, 549-557 (1990).
J. D. Barchers and B. L. Ellerbroek, "Improved compensation of turbulence-induced amplitude and phase distortions by means of multiple near-field phase adjustments," *J. Opt. Soc. Am. A*, vol. 18, No. 2, Feb. 2001, pp. 399-411.

(Continued)

*Primary Examiner*—Michael A Lyons
(74) *Attorney, Agent, or Firm*—McDermott Will & Emery LLP (57) ABSTRACT

A multi-conjugate adaptive optics system is described that reduces aberration-induced fluctuations of amplitude and phase in a beam without requiring the explicit measurement and feedback control of the beam's irradiance profile. The system uses a pair of wavefront correctors conjugated to widely separated planes in a turbulent path, where each of the wavefront correctors is controlled by a decentralized wavefront control loop. The system is configured such that the explicit control of phase fluctuations in a beam using the pair of wavefront correctors results in the implicit control of amplitude fluctuations in the beam. Because the system uses decentralized control loops that do not rely on beam irradiance measurement and feedback, the complexity of the control loop is reduced below that of conventional multi-conjugate adaptive optics systems and is comparable to that of single-conjugate adaptive optics systems.

20 Claims, 3 Drawing Sheets

OTHER PUBLICATIONS

J. D. Barchers, "Closed-loop stable control of two deformable mirrorsfor compensation of amplitude and phase fluctuations," *J. Opt. Soc. Am. A*, vol. 19, No. 5, May 2002, pp. 926-945.

J. D. Barchers and D. L. Fried, "Optimal control of laser beams for propagation through a turbulent medium," *J. Opt. Soc. Am. A*, vol. 19, No. 9, Sep. 2002, pp. 1779-1793.

J. D. Barchers, "Closed-loop stable control of two deformable mirrors for compensation of amplitude and phase fluctuations: errata," *J. Opt. Soc. Am. A* vol. 20, No. 9, Sep. 2003, pp. 1831-1832.

J. D. Barchers, "Noise gain and misregistration calculations for a two deformable mirror field conjigation system," *Laser Weapons Technology III*, W. E. Thompson and P. H. Merritt, eds., *Proc. SPIE* vol. 4724, pp. 1-16 (2002).

M. Yu and M. A. Vorontsov, "Compensation of distant phase-distorting layers. I. Narrow-field-of-view adaptive receiver system," *J. Opt. Soc. Am. A* vol. 21, No. 9, Sep. 2004, pp. 1645-1658.

M. A. Vorontsov and M. Yu, "Compensation of distant phase-distorting layers. II. Extended-field-of-view adaptive receiver system," *J. Opt. Soc. Am. A* vol. 21, No. 9, Sep. 2004, pp. 1659-1668.

M. C. Roggemann and D. J. Lee, "Two-deformable-mirror concept for correcting scintillation effects in laser beam projection through the turbulent atmosphere," *Appl. Opt.* vol. 37, No. 21, Jul. 20, 1998, pp. 4577-4585.

V. Bagnoud and J. D. Zuegel, "Independent phase and amplitude control of a laser beam by use of atingle-phase-only spatial light modulator," *Optics Letters*, vol. 29, NO. 3, Feb. 1, 2004, pp. 295-297.

I. Pham and S. Ma, "Amplitude and phase controlled adaptive optics system," *Advances in Adaptive Optics II*, B. L. Ellerbroek and D. Bonaccini Calia, eds., *Proc. SPIE*, vol. 6272, pp. 62721Q-1-62721Q-11 (2006).

L. Lee, G. Baker, and R. Benson, "Wavefront Control Limitations Due to Scintillation in Multi-Conjugate Adaptive Optics," *Proceedings of the 2005 AMOS Technical Conference*, P. Kervin and J. Africano, eds. (Maui Economic Development Board, Kihei, Maui, Hawaii, 2005), pp. 678-687.

L. H. Lee, G. J. Baker, and R. S. Benson, "Correctability limitations imposed by plane-wave scintillation in multiconjugate adaptive optics," *J. Opt. Soc. Am. A*, vol. 23, No. 10, Oct. 2006, pp. 2602-2612.

L. H. Lee, "Correctability limitations imposed by spherical-wave scintillation in multi-conjugate adaptive optics," *Advances in Adaptive Optics*, B. L. Ellerbroek and D. Bonaccini Calia, eds., *Proc. SPIE* vol. 6272, pp. 62721Z-1-62721Z-12 (2006).

G. A. Tyler, "Reconstruction and assessment of the least-squares and slope discrepancy components of the phase," *J. Opt. Soc. Am. A*, vol. 17, No. 10, Oct. 2000, pp. 1828-1839.

J. D. Barchers, et al., "The perfonnance of wavefront sensors in strong scintillation," *Adaptive Optical System Technologies II*, P. L. Wizinowich and D. Bonaccini, eds., *Proc. SPIE*, vol. 4839, pp. 217-227 (2003).

A. J. Devaney, H. J. Lift, and S. Apsell, "Spectral representations for free space propagation of complex phase perturbations of optical fields," *Optics Communications*, vol. 15, No. 1, Sep. 1975, pp. 1-5.

R. W. Lee and J. C. Harp, "Weak scattering in random media, with applications to remote probing," *Proc. IEEE*, vol. 57, No. 4, Apr. 1969, pp. 375-406.

R. S. Lawrence and J. W. Strohbehn, "A Survey of Clear-Air Propagation Effects Relevant to Optical Communications," *Proc. IEEE*, vol. 58, No. 10, Oct. 1970, pp. 1523-1545.

\* cited by examiner

MULTI-CONJUGATE ADAPTIVE OPTICS SYSTEM FOR FIELD CONJUGATION

This application claims the benefit of U.S. Provisional Application No. 60/855,122 filed on Oct. 30, 2006, which is hereby incorporated by reference.

STATEMENT AS TO RIGHTS TO INVENTIONS MADE UNDER FEDERALLY SPONSORED RESEARCH OR DEVELOPMENT

Not applicable.

FIELD OF THE INVENTION

The invention generally concerns adaptive optics systems and, more particularly, a multi-conjugate adaptive optics system for reducing aberration-induced fluctuations in a beam wavefront.

BACKGROUND OF THE INVENTION

Scintillation of beams as they propagate long distances through random media limits the performance of imaging and laser projection systems. Adaptive optics are often employed to mitigate the beam fluctuations induced by aberrations in the media. For example, single-conjugate adaptive optics systems detect the wavefront of a beam and drive a wavefront corrector based on the detection to correct fluctuations in the wavefront. Single-conjugate adaptive optics systems, however, are traditionally limited to correcting only the phase component of aberration-induced fluctuations.

Multi-conjugate adaptive optics systems have been developed that use multiple wavefront sensors and wavefront correctors to reduce both phase and amplitude fluctuations in the wavefront of a beam. Conventional field conjugation systems using multi-conjugate adaptive optics typically rely on explicit beam shaping to mitigate the errors caused by scintillation of the beam. Accordingly, these systems require direct measurement and feedback control of beam irradiance profiles. In addition, the control algorithms used to correct the wavefront through beam shaping are intensive and complex.

SUMMARY OF THE INVENTION

The present invention provides a multi-conjugate adaptive optics system that reduces aberration-induced fluctuations of amplitude and phase in a beam without requiring the explicit measurement and feedback control of the beam's irradiance profile. The system uses a pair of wavefront correctors conjugated to widely separated planes in a turbulent path, where each of the wavefront correctors is controlled by a decentralized wavefront control loop. The system is configured such that the explicit control of phase fluctuations in a beam using the pair of wavefront correctors results in the implicit control of amplitude fluctuations in the beam. Because the system uses decentralized control loops that do not rely on beam irradiance measurement and feedback, the complexity of the control loop is reduced below that of conventional multi-conjugate adaptive optics systems and is comparable to that of single-conjugate adaptive optics systems.

According to one aspect of the invention, a multi-conjugate adaptive optics system is provided for reducing aberration-induced fluctuations in a beam. The system includes a first wavefront corrector configured to correct a wavefront of a beam and a first wavefront sensor configured to measure the wavefront of the beam corrected by the first wavefront corrector, wherein the first wavefront sensor and the first wavefront corrector are conjugated to a first plane. The system further includes a second wavefront corrector configured to correct the wavefront of the beam corrected by the first wavefront corrector and a second wavefront sensor configured to measure the wavefront of the beam corrected by the second wavefront corrector, wherein the second wavefront sensor and the second wavefront corrector are conjugated to a second plane separated from the first plane. The first wavefront corrector is configured to correct the wavefront based on the measurement of the first wavefront sensor, and the second wavefront corrector is configured to correct the wavefront based on the measurement of the second wavefront sensor.

According to another aspect of the invention, a method for reducing turbulence-induced fluctuations in a beam is provided. The method includes correcting a wavefront of a beam with a first wavefront corrector and measuring the wavefront of the beam corrected with the first wavefront corrector with a first wavefront sensor, wherein the first wavefront corrector and the first wavefront sensor are conjugated to a first plane. The method further includes correcting the wavefront of the beam corrected with the first wavefront corrector with a second wavefront corrector and measuring the wavefront of the beam corrected with the second wavefront corrector with a second wavefront sensor. The second wavefront corrector and the second wavefront sensor are conjugated to a second plane separated from the first plane. The first correcting step comprises correcting the wavefront based on the measurement obtained in the first detecting step, and the second correcting step comprises correcting the wavefront based on the measurement obtained in the second detecting step.

According to another aspect of the invention, a multi-conjugate adaptive optics system is provided for reducing turbulence-induced fluctuations in a beam. The system includes a first wavefront corrector configured to correct a wavefront of an incident beam and a first wavefront sensor configured to measure the wavefront of the incident beam corrected by the first wavefront corrector, wherein the first wavefront corrector and the first wavefront sensor are conjugated to a first plane. A second wavefront corrector is configured to correct a wavefront of the incident beam corrected by the first wavefront corrector and a second wavefront sensor configured to measure the wavefront of the incident beam corrected by the second wavefront corrector, wherein the second wavefront corrector and the second wavefront sensor are conjugated to a second plane. A third sensor is configured to measure a wavefront of a probe beam corrected by the second wavefront corrector, wherein the third sensor is conjugated to a third plane. The optical path length between the first and second planes is equal to the optical path length between the second and third planes. The first wavefront corrector is configured to correct the wavefront based on a combination of the measurements of the first wavefront sensor and the third wavefront sensor, and the second wavefront corrector is configured to correct the wavefront based on the measurement of the second wavefront sensor. The probe beam propagates along a common path of the incident beam within the system.

According to another aspect of the invention, a method for reducing turbulence-induced fluctuations in a beam is provided. The method includes the steps of correcting a wavefront of an incident beam with a first wavefront corrector and measuring the wavefront of the incident beam corrected with the first wavefront corrector with a first wavefront sensor, wherein the first wavefront corrector and the first wavefront sensor are conjugated to a first plane. The method further includes correcting the wavefront of the incident beam corrected with the first wavefront corrector with a second wavefront corrector and measuring the wavefront of the incident beam corrected with the second wavefront corrector with a second wavefront sensor, wherein the second wavefront corrector and the second wavefront sensor are conjugated to a second plane separated from the first plane. A wavefront of a probe beam corrected with the second wavefront corrector is measured with a third wavefront sensor, wherein the third wavefront sensor is conjugated to a third plane. The optical path length between the first and second planes is equal to the optical path length between the second and third planes. The first correcting step comprises correcting the wavefront based on a combination of the measurements obtained in the first and third detecting steps, and the second correcting step comprises correcting the wavefront based on the measurement obtained in the second detecting step.

The foregoing summary of the invention has been provided so that the nature of the invention can be understood quickly. A more detailed and complete understanding of the preferred embodiments of the invention can be obtained by reference to the following description of the invention together with the associated drawings.

DETAILED DESCRIPTION OF THE INVENTION

The detailed description of the invention set forth below in connection with the associated drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without all of the specific details contained herein. In some instances, well known structures and components are shown in block diagram form in order to avoid obscuring the concepts of the invention.

Figure 1:
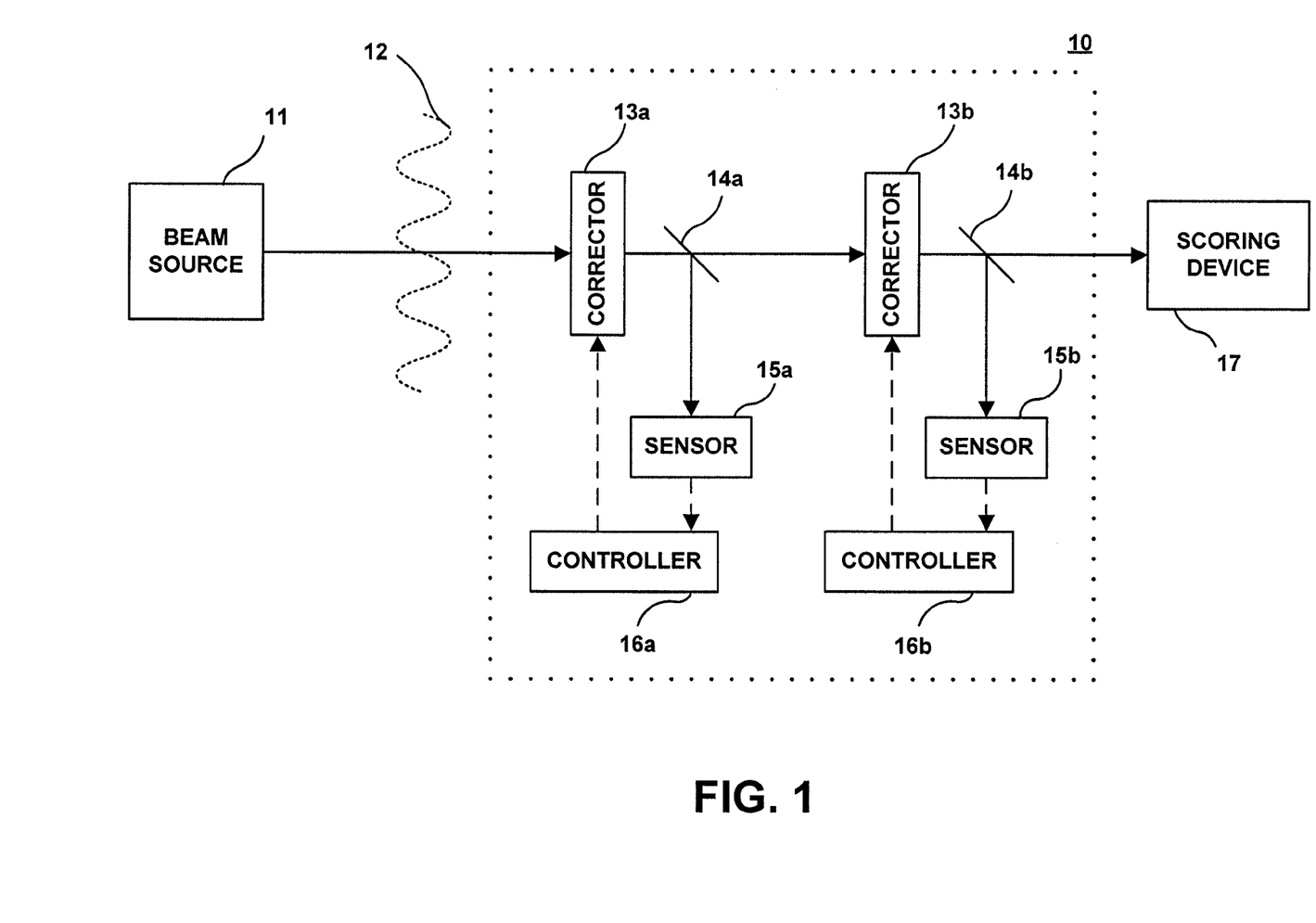
FIG. 1 is a block diagram depicting a unidirectional multi-conjugate adaptive optics system according to one embodiment of the invention.

FIG. 1 is a block diagram depicting components of a multi-conjugate adaptive optics (MCAO) system 10 according to one embodiment of the invention arranged in a remote sensing application. As depicted in FIG. 1, beam source 11 emits a beam that propagates through media to MCAO system 10. The beam path is represented in FIG. 1 by the solid arrows. Aberration 12 within the media is represented by a curved line. MCAO system 10 reduces fluctuations induced in the beam by aberration 12 prior to the beam being imaged by scoring device 17.

Beam source 11 represents the source of a beam of interest. For example, the beam may be light from a star or planet being observed, an incoming signal from a laser communications transmitter, a beacon plane wave, etc. As the beam propagates for long distances through random media, such as atmospheric turbulence, aberration 12 induces scintillation in the beam. The resulting fluctuations in phase and amplitude expressed at the wavefront of the beam degrade the quality of the beam and thereby limit its usefulness.

MCAO system 10 receives the scintillated beam and reduces the fluctuations in phase and amplitude of the beam wavefront to restore the usefulness of the beam when imaged by scoring device 17. The components of MCAO 10 are arranged within a controlled environment (temperature, air, humidity, etc.) so as to minimize additional aberrations in the beam path within the system. As depicted in FIG. 1, MCAO system 10 includes wavefront correctors 13a and 13b, beam splitters 14a and 14b, wavefront sensors 15a and 15b, and controllers 16a and 16b. Although not depicted in FIG. 1, one of ordinary skill in the art will recognize that various receiving and relay optics are used to receive and propagate a beam through MCAO system 10. For example, the beam may be collected and focused by a receiving telescope prior to propagating through MCAO system 10. Additionally, the beam path and the arrangement of components within MCAO system 10 may vary from that depicted in FIG. 1 through the use of optical components known to those skilled in the art without departing from the scope of the invention. For purposes of this description, these receiving and relay optics have been omitted from FIG. 1 so as not to obscure the depicted components that are used to describe the operation of the novel MCAO system.

Wavefront correctors 13a and 13b are configured to alter and correct the phase of the wavefront of an incident beam in accordance with a control signal. According to one embodiment of the invention, each of wavefront correctors 13a and 13b is implemented using a deformable mirror in which a reflective surface is manipulated by mechanisms in accordance with the control signal. By supplying an appropriate control signal to the deformable mirror, the phase of the incident beam can be altered so as to null the beam's wavefront. The deformable mirror may have a continuous reflective surface or, alternatively, the deformable mirror may be segmented. A segmented deformable mirror improves performance of the system in the case of strong scintillation where the phase profile of the beam may be discontinuous.

Beam splitters 14a and 14b divide the beam propagating along the beam path after it has been corrected by wavefront correctors 13a and 13b, respectively. Beam splitters 14a and 14b redirect a divided portion of the beam to wavefront sensors 15a and 15b, respectively. The invention is not limited to any particular type of beam splitter. Any of a number of beam splitters known to those skilled in the art may be used without departing from the scope of the invention.

Wavefront sensors 15a and 15b receive the divided portion of the beam redirected by the respective beam splitters 14a and 14b and measure the phases of the beams' wavefronts. Wavefront sensors 15a and 15b may be implemented using any of a number of known wavefront sensors. According to one embodiment, wavefront sensors 15a and 15b are implemented using a point-diffraction, phase-shifting interferometer (self-referencing interferometer). The measured phases of the wavefronts are provided by wavefront sensors 15a and 15b to controllers 16a and 16b, respectively.

Controllers 16a and 16b are processing systems configured to sample the measured phases detected by wavefront sensors 15a and 15b, respectively, and generate control signals for manipulating the reflective surfaces of wavefront correctors 13a and 13b. Together with wavefront correctors 13a and 13b and wavefront sensors 15a and 15b, controllers 16a and 16b form two independent integral control loops. The first integral control loop comprises wavefront corrector 13a, wavefront sensor 14a and controller 16a. Similarly, the second integral control loop comprises wavefront corrector 13b, wavefront sensor 14b and controller 16b. Each integral control loop operates independent of the other. Accordingly, the complexity of the control algorithm used in each control loop is less than that required in conventional MCAO systems and is similar to that in single-conjugate adaptive optics systems.

As noted above, each of controllers 16a and 16b are used to implement an integral control loop. Controllers 16a and 16b increment the corrective signals applied to wavefront correctors 13a and 13b using the phase measurements provided by wavefront sensors 15a and 15b. Specifically, the following control law is used for MCAO system 10 depicted in FIG. 1:

$$qu_1 = -(k_1 y_1) \quad (1)$$

$$qu_2 = -(k_2 y_2) \quad (2)$$

where $qu_1$ is the increment to the control command for wavefront corrector 13a generated by controller 16a, $y_1$ is the phase of the wavefront measured by wavefront sensor 15a, $k_1$ is the user-specified gain of the first control loop, $qu_2$ is the increment to the control command for wavefront corrector 13b generated by controller 16b, $y_2$ is the phase of the wavefront measured by wavefront sensor 15b, and $k_2$ is the user specified gain of the second control loop.

Equations (1) and (2) shown above are simplified representations of the mathematical algorithms used to implement the control law of the MCAO system. These simplified representations are provided to aid in the understanding of the overall operation of the MCAO system. Those skilled in the art will recognize that the mathematical algorithms used to implement the control law in the MCAO system may include higher order terms, spatial filtering, temporal filtering, matrix calculations, vector calculations, etc. that are commonly applied in modeling and controlling MCAO systems.

The gains of the respective control loops are set based on a number of factors. These factors include the kinematics and other properties of the media through which the beam propagates, properties of the MCAO system components such as sensor noise, optical flaws, etc., processing capacities of the MCAO system, etc. In order to mitigate the effects of scintillation in the beam, the gains must be higher than the characteristic rate of fluctuations within the media. The characteristic rate may be determined using theoretical modeling and analysis based on known conditions within the media as well empirical investigation of the media itself.

MCAO systems may be configured to minimize wave error variance of an incident beam. Wave error variance is a function of the ratio of the controller gain and the characteristic frequency of the media. Accordingly, as the controller gain increases with respect to the characteristic frequency, the wave error variance generally decreases. Other properties of MCAO systems limit how high the controller gains may be set before performance begins to decline. For example sensor noise and other sources of noise within the MCAO system may overwhelm the improvements in wave error variance if the controller gain is set too high. Additionally, the frame rate of the wavefront sensor and controller to process the phase measurements places an upper limit on the controller gain value.

As described above, the controller gain value is dependent upon several properties of both the media through which the beam propagates and the MCAO system itself. Selecting appropriate gains using both theoretical analysis and experimental settings/adjustments in view of these dependencies is well known in the art and will not be described in further detail herein. According to one embodiment, the controller gains are set to be at least 100 Hz and at least two times the characteristic frequency of the media. Preferably the gains for the first and second control loop are equal. However, these gains may vary in alternative embodiments depending on variations in the system with respect to the first and second control loops, such as different sensors and/or optics.

Controllers 16a and 16b are coupled to wavefront sensors 15a and 15b, respectively, to facilitate the communication of phase measurements and to wavefront correctors 13a and 13b to facilitate the communication of corrective control signals. This communication coupling is represented in FIG. 1 by the dashed arrows. Controllers 16a and 16b may be implemented in a number of different ways. For example, the controllers may be implemented using a computer in which a processor loads and executes a sequence of instructions stored in computer-readable media to perform the control algorithm. The computer-readable media is not limited to any particular type of media and may be magnetic media, optical media, or IC-based media such as Flash memory. Alternatively, the controllers may be implemented using an arrangement of integrated circuits, either off the shelf or application specific, configured specifically for the MCAO system. While FIG. 1 depicts a separate controller for each control loop, MCAO system 10 may be implemented using a single controller executing independent control algorithms for each of the control loops.

As discussed above, the wavefront sensors detect and measure the phase of the beam wavefront after it has been corrected by the respective wavefront correctors. The measured phase is used by the controllers to increment the corrective control signals applied to the respective wavefront correctors to correct the phase of the beams incident to the respective wavefront correctors. The integral control loops drive this phase correction to null the wavefronts. Accordingly, aberration-induced phase fluctuations in the incident beam are explicitly corrected using the integral control loops. Aberration-induced amplitude fluctuations in the beam, on the other hand, are controlled implicitly by the control loops as described below.

Wavefront corrector 13a and wavefront sensor 14a are conjugated to a first plane in the beam path. Similarly, wavefront corrector 13b and wavefront sensor 14b are conjugated to a second plane in the beam path separated from the first plane. As the beam propagates along the beam path, amplitude fluctuations at one point in the beam path appear as phase fluctuations at another point in the beam path due to diffraction of the beam. By selecting appropriate locations for the first and second planes, the phase correction performed by the second control loop may be used to compensate for amplitude fluctuations in the beam. In this manner, MCAO system 10 may be used to reduce scintillation of the beam without having to measure and explicitly control beam irradiance profiles, thereby simplifying the control algorithms.

For purposes of describing the locations of the first plane and the second plane within the turbulent beam path, the location of beam source 11 is set at zero, aberration 12 is at $z_0$, the entrance pupil to MCAO system 10 is at a distance L from beam source 11, the first plane is at $z_1$, and the second plane is at $z_2$. According to one embodiment of the invention, the position of the first plane $z_1$ within the beam path is set to the location of the entrance pupil to MCAO system 10. The separation between the first and second planes, and hence the location of $z_2$, is set relative to $z_1$ to achieve a desired level of correction in the beam fluctuations.

Figure 2:
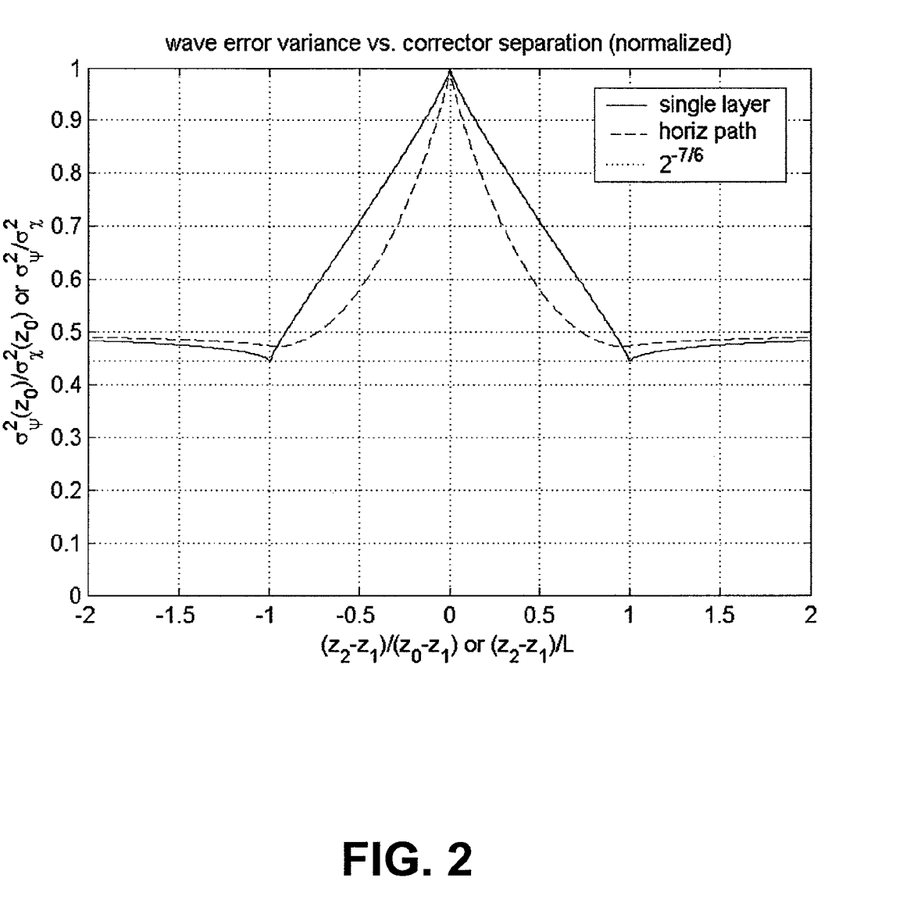
FIG. 2 is a graph depicting normalized wave error variance versus normalized wavefront corrector separation within a multi-conjugate adaptive optics system according to one embodiment of the invention.

FIG. 2 is a graph depicting normalized wave error variance versus normalized wavefront corrector separation within MCAO system 10. The single layer line in the graph is based on a non-uniform distribution of disturbances within the turbulent beam path being represented by a single layer. General distributions of disturbances can be aggregated and characterized by superposition of the effects of multiple layers, for example, by using integrals weighted by the single layer line in FIG. 2. The horizontal path line is based on a uniform distribution of disturbances along a horizontal beam path between the beam source and the MCAO system that is represented by such an integral of the distribution along the path. As depicted in the graph, wave error variance is optimized when the separation between the conjugated planes of the wave front correctors is at least as long as the distance between the entrance pupil and the representative single layer of disturbances or the turbulent path length between the beam source and the entrance pupil L for the horizontal path distribution. By arranging MCAO system 10 such that $|z_2-z_1|=|z_0-z_1|$ for representative single layers of disturbance or $|z_2-z_1|=|0.96L|$ for horizontal paths of uniform disturbance, the wave error variance can be optimally reduced by more than 50%. As represented in the graph, separation distances approximately equal to or greater than these values also result in a near optimal reduction in wave error variance.

Those skilled in the art will recognize that when determining the beam path lengths within MCAO system 10 in comparison to the beam path lengths in the media external to MCAO system 10, the internal beam path length may be scaled based on the optical properties within MCAO system 10, such as the magnification of a receiving telescope. Furthermore, the separation distances are limited to the near-field of the beam source.

Figure 3:
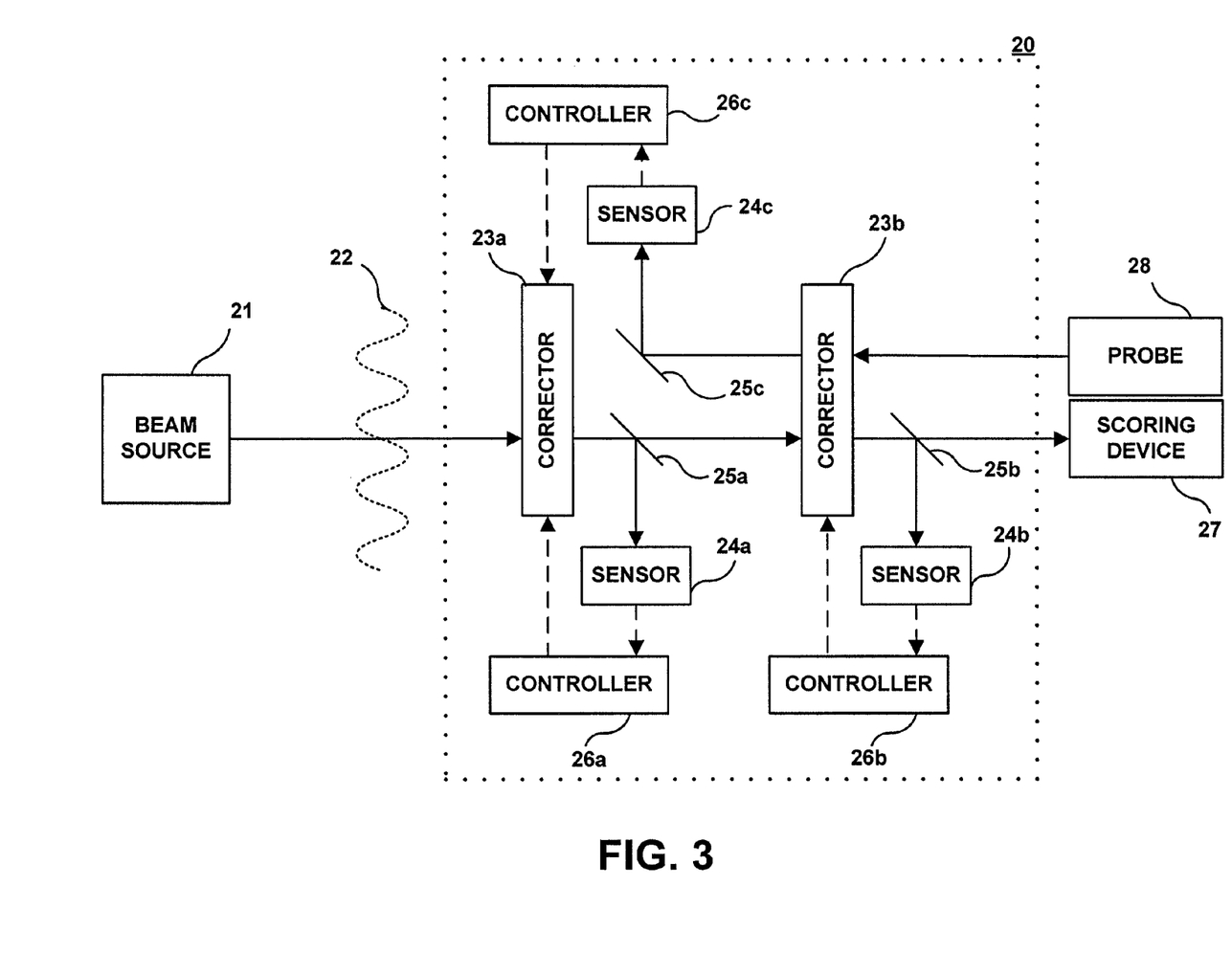
FIG. 3 is a block diagram depicting a bidirectional multi-conjugate adaptive optics system according to one embodiment of the invention.

MCAO system 10 represented in FIG. 1 is considered a unidirectional system in which an incident beam is propagated through the system and imaged at scoring device 17. FIG. 3 is a block diagram depicting components of MCAO system 20 according to one embodiment of the invention. MCAO system 20 is a bidirectional system that uses an internal probe beam and an additional wavefront sensor to reduce aberration-induced fluctuations in an incident beam. As depicted in FIG. 3, MCAO system 20 includes wavefront correctors 23a and 23b, beam splitters 25a, 25b and 25c, wavefront sensors 24a, 24b and 24c, and controllers 26a, 26b and 26c. The operation of each of these components individually is the same as that described above with respect to FIG. 1 and therefore will not be repeated here.

In addition to the foregoing components, the arrangement depicted in FIG. 3 includes a probe beam source 28 that generates a plane wave that propagates along a beam path through MCAO system 20 to wavefront sensor 24c. Specifically, probe beam source 28 emits a probe plane wave that propagates to wavefront corrector 23b, which alters the phase of the wavefront in accordance with the control signal provided by controller 26b. The phase-altered plane wave then propagates through the beam path until it reaches beam splitter 25c, which redirects a portion of the beam to wavefront sensor 24c. Wavefront sensor 24c measures the phase of the wavefront and provides the measurement to controller 26c.

MCAO system 20 is configured such that the length of the beam path traveled by the probe plane wave within the system is equal to the length of the beam path traveled by the incident beam within the system. Additionally, MCAO system 20 may be configured to propagate the probe plane wave along the same beam path, but in the opposite direction, as the incident beam propagates in MCAO system 20. Different polarizations, or other techniques known to those of skill in the art, may be used to facilitate propagating the probe plane wave and the incident beam along a common beam path.

Wavefront sensor 24c is conjugated to a third plane, where the optical path length between the third plane and the second plane, to which wavefront sensor 24b and corrector 23b are conjugated, is the same as the optical path length between the second and first plane, to which wavefront sensor 24a and corrector 23a are conjugated. For implementations in which the probe plane wave propagates along the same beam path as the incident beam, but in an opposition direction, the third plane and the first plane are the same (i.e., wavefront sensor 24c is conjugated to the same first plane as wavefront sensor 24a and corrector 23a). Accordingly, the propagation distance of the probe plane wave between the conjugation planes is equal to the propagation distance of the incident wave between the conjugation planes.

The phase of the wavefront measured by wavefront sensor 24c is provided to controller 26c and used to generated the corrective control signal supplied to wavefront corrector 23a. Including the measured phase of the probe plane wave after being altered by wavefront corrector 23b and propagating along the beam path to wavefront sensor 24c introduces control loop coupling and cyclical signal flow between the first control loop, which now includes wavefront sensor 24c and controller 26c, and the second control loop. This coupling and cyclical signal flow leads to more accurate reduction in the amplitude fluctuations of the incident beam without the explicit measurement and feedback of beam irradiance. As with the unidirectional MCAO system 10, amplitude information is transformed into phase information and phase information is transformed into amplitude information photonically rather than algorithmically.

To incorporate the measured phase of the probe plane wave into the control algorithm, the following control law is used in place of the law presented above in equations (1) and (2) for MCAO system 20:

$$qu_1 = -(k_1 y_1 + k_3 y_3) \qquad (3)$$

$$qu_2 = -(k_2 y_2) \qquad (4)$$

where $qu_1$ is the increment to the control command for wavefront corrector 23a generated by controllers 26a and 26c, $y_1$ is the phase of the wavefront measured by wavefront sensor 24a, $y_3$ is the phase of the wavefront measured by wavefront sensor 24c, $k_1$ and $k_3$ are user-specified gains of the first control loop. The variables for equation (4) are the same as described above with respect to equation (2).

The same considerations for setting the controller gains discussed above with respect to the unidirection MCAO system apply to setting the gains for the bidirectional MCAO system. In addition to those considerations, stability of the system requires that $k_1$ is set to be larger than $k_3$ Preferably, the $k_3$ is as close as possible to $k_1$ while maintaining system stability. Actual values for these controller gains will again depend on the characteristics of the system components and the properties of the media. Those skilled in the art will recognize various techniques that may be used to determined preferred gain values for specific applications and components.

As indicated above, both the phase of the probe plane wave measured by wavefront sensor 24c and the phase of the incident beam measured by wavefront sensor 24a are used to generate the corrective control signal supplied to wavefront corrector 23a. Controllers 26a and 26c are depicted in FIG. 3 using two distinct blocks to simplify the diagram. Those skilled in the art will recognize that a single controller would received the measured phases of the wavefronts from wavefront sensor 24a and wavefront sensor 24c and generate a signal corrective control signal to be supplied to wavefront corrector 23a.

The foregoing description is provided to enable one skilled in the art to practice the various embodiments of the invention described herein. Various modifications to these embodiments will be readily apparent to those skilled in the art, and generic principles defined herein may be applied to other embodiments. Thus, the following claims are not intended to be limited to the embodiments of the invention shown and described herein, but are to be accorded the full scope consistent with the language of the claims. All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A multi-conjugate adaptive optics system for reducing aberration-induced fluctuations in a beam, the system comprising:
    a first wavefront corrector configured to correct a wavefront of a beam;
    a first wavefront sensor configured to measure the wavefront of the beam corrected by said first wavefront corrector, wherein said first wavefront sensor and said first wavefront corrector are conjugated to a first plane;
    a second wavefront corrector configured to correct the wavefront of the beam corrected by said first wavefront corrector; and
    a second wavefront sensor configured to measure the wavefront of the beam corrected by said second wavefront corrector, wherein said second wavefront sensor and said second wavefront corrector are conjugated to a second plane separated from the first plane,
    wherein said first wavefront corrector is configured to correct the wavefront based on the measurement of said first wavefront sensor, and said second wavefront corrector is configured to correct the wavefront based on the measurement of said second wavefront sensor.

2. The multi-conjugate adaptive optics system according to claim 1, wherein said first wavefront corrector and said second wavefront corrector each comprises a deformable mirror.

3. The multi-conjugate adaptive optics system according to claim 2, wherein the deformable mirror is segmented.

4. The multi-conjugate adaptive optics system according to claim 1, wherein said first wavefront sensor and said second wavefront sensor each comprises a phase-shifting, point-diffraction interferometer.

5. The multi-conjugate adaptive optics system according to claim 1, wherein said first wavefront corrector is configured to null the phase of the wavefront based on the measurement of said first wavefront sensor and independent of the measurement of said second wavefront sensor, and said second wavefront corrector is configured to null the phase of the wavefront based on the measurement of said second wavefront sensor and independent of the measurement of said first wavefront sensor.

6. The multi-conjugate adaptive optics system according to claim 1, wherein the scaled optical path length separating the first and second planes is approximately equal to or greater than the optical path length between an aberration in the beam path and the multi-conjugate adaptive optics system.

7. A method for reducing turbulence-induced fluctuations in a beam, the method comprising the steps of:
    correcting a wavefront of a beam with a first wavefront corrector;
    measuring the wavefront of the beam corrected with the first wavefront corrector with a first wavefront sensor, wherein the first wavefront corrector and the first wavefront sensor are conjugated to a first plane;
    correcting the wavefront of the beam corrected with the first wavefront corrector with a second wavefront corrector; and
    measuring the wavefront of the beam corrected with the second wavefront corrector with a second wavefront sensor, wherein the second wavefront corrector and the second wavefront sensor are conjugated to a second plane separated from the first plane,
    wherein the first correcting step comprises correcting the wavefront based on the measurement obtained in the first detecting step, and the second correcting step comprises correcting the wavefront based on the measurement obtained in the second detecting step.

8. The method according to claim 7, wherein said first correcting step comprises nulling the phase of the wavefront of the beam independent of said second correcting step and said second correcting step comprises nulling the phase of the wavefront of the beam independent of said first correcting step.

9. The method according to claim 7, wherein the scaled optical path length separating the first and second planes is approximately equal to or greater than the optical path length between an aberration in the beam path and the multi-conjugate adaptive optics system.

10. A multi-conjugate adaptive optics system for reducing turbulence-induced fluctuations in a beam, the system comprising:
    a first wavefront corrector configured to correct a wavefront of an incident beam;
    a first wavefront sensor configured to measure the wavefront of the incident beam corrected by said first wavefront corrector, wherein said first wavefront corrector and said first wavefront sensor are conjugated to a first plane;
    a second wavefront corrector configured to correct a wavefront of the incident beam corrected by said first wavefront corrector;
    a second wavefront sensor configured to measure the wavefront of the incident beam corrected by said second wavefront corrector, wherein said second wavefront corrector and said second wavefront sensor are conjugated to a second plane; and
    a third sensor configured to measure a wavefront of a probe beam corrected by said second wavefront corrector, wherein said third sensor is conjugated to a third plane and the optical path length between the first and second planes is equal to the optical path length between the second and third planes, and
    wherein said first wavefront corrector is configured to correct the wavefront based on a combination of the measurements of said first wavefront sensor and said third wavefront sensor, and said second wavefront corrector is configured to correct the wavefront based on the measurement of said second wavefront sensor.

11. The multi-conjugate adaptive optics system according to claim 10, wherein said first wavefront corrector and said second wavefront corrector each comprise a deformable mirror.

12. The multi-conjugate adaptive optics system according to claim 11, wherein the deformable mirror is a segmented deformable mirror.

13. The multi-conjugate adaptive optics system according to claim 10, wherein said first wavefront sensor, said second wavefront sensor and said third sensor each comprises a phase-shifting, point-diffraction interferometer.

14. The multi-conjugate adaptive optics system according to claim 10, wherein said first wavefront corrector is configured to null the phase of the wavefront based on the measurements of said first and third sensors and independent of the measurement of said second sensor, and said second wavefront corrector is configured to null the phase of the wavefront based on the measurement of said second wavefront sensor and independent of the measurements of said first and third sensors.

15. The multi-conjugate adaptive optics system according to claim 10, wherein said third sensor is conjugated to the first plane and the probe beam propagates along a common path of the incident beam in the opposite direction of the incident beam within the system.

16. The multi-conjugate adaptive optics system according to claim 10, wherein the scaled optical path length separating the first and second planes is approximately equal to or greater than the optical path length between an aberration in the beam path and the multi-conjugate adaptive optics system.

17. A method for reducing turbulence-induced fluctuations in a beam, the method comprising the steps of:
    correcting a wavefront of an incident beam with a first wavefront corrector;
    measuring the wavefront of the incident beam corrected with the first wavefront corrector with a first wavefront sensor, wherein the first wavefront corrector and the first wavefront sensor are conjugated to a first plane;
    correcting the wavefront of the incident beam corrected with the first wavefront corrector with a second wavefront corrector;
    measuring the wavefront of the incident beam corrected with the second wavefront corrector with a second wavefront sensor, wherein the second wavefront corrector and the second wavefront sensor are conjugated to a second plane separated from the first plane; and
    measuring a wavefront of a probe beam corrected with the second wavefront corrector with a third wavefront sensor, wherein the third wavefront sensor is conjugated to a third plane and the optical path length between the first and second planes is equal to the optical path length between the second and third planes,
    wherein the first correcting step comprises correcting the wavefront based on a combination of the measurements obtained in the first and third measuring steps, and the second correcting step comprises correcting the wavefront based on the measurement obtained in the second measuring step.

18. The method according to claim 17, wherein said first correcting step comprises nulling the wavefront of the incident beam independent of said second correcting step and said second correcting step comprises nulling the wavefront of the incident beam independent of said first correcting step.

19. The method according to claim 17, wherein the third sensor is conjugated to the first plane and the probe beam propagates along a common path of the incident beam in the opposite direction of the incident beam within the system.

20. The method according to claim 17, wherein the scaled optical path length separating the first and second planes is approximately equal to or greater than the optical path length between an aberration in the beam path and the multi-conjugate adaptive optics system.

* * * * *